(12) United States Patent
Wang et al.

(10) Patent No.: US 12,731,604 B2
(45) Date of Patent: Sep. 8, 2026

(54) SHIELD DESIGNS FOR TWO DIMENSIONAL MAGNETIC RECORDING READ HEADS

(71) Applicant: Western Digital Technologies, Inc., San Jose, CA (US)

(72) Inventors: Yung-Hung Wang, San Jose, CA (US); Ming Mao, Dublin, CA (US); James Mac Freitag, Sunnyvale, CA (US); Chih-Ching Hu, Pleasanton, CA (US); Chen-Jung Chien, Mountain View, CA (US); Yuankai Zheng, Fremont, CA (US); Alexander M. Zeltser, San Jose, CA (US); Fang Chen, Livermore, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/753,753

(22) Filed: Jun. 25, 2024

(65) Prior Publication Data

US 2025/0391427 A1 Dec. 25, 2025

(51) Int. Cl.
*G11B 5/11* (2006.01)

(52) U.S. Cl.
CPC ..................................... *G11B 5/11* (2013.01)

(58) Field of Classification Search
None
See application file for complete search history.

(56) References Cited

U.S. PATENT DOCUMENTS 6,466,419 B1 10/2002 Mao
8,144,437 B2 3/2012 Miyauchi et al.
(Continued)

FOREIGN PATENT DOCUMENTS

CN 114664330 A 6/2022
EP 2521122 A1 11/2012

OTHER PUBLICATIONS

Wood, Roger, "Shingled Magnetic Recording (SMR) and Two-Dimensional Magnetic Recording (TDMR)", Journal of Magnetism and Magnetic Materials, vol. 561, Nov. 1, 2022, pp. 1-32, <https://www.sciencedirect.com/science/article/abs/pii/S0304885322005820?via%3Dihub>.

(Continued)

*Primary Examiner* — William J Klimowicz
(74) *Attorney, Agent, or Firm* — Patterson + Sheridan, LLP

(57) ABSTRACT

The present disclosure generally relates to a two dimensional magnetic recording (TDMR) read head. The read head comprises a lower shield, a lower sensor disposed on the lower shield, a middle shield disposed over the lower sensor, an upper sensor disposed on the middle shield, and an upper shield disposed over the upper sensor. In one embodiment, the middle shield is a simple pinned shield comprising a first ferromagnetic (FM) layer, an antiferromagnetic (AFM) layer disposed on the first FM layer, and a second FM layer disposed on the AFM layer, and the upper shield is a synthetic antiferromagnetic (SAF) pinned shield comprising a first pinned layer, an antiferromagnetic coupling (AFC) layer, such as Ru, disposed on the first pinned layer, and a second pinned layer disposed on the AFC layer. In another embodiment, the middle shield is a SAF pinned shield and the upper shield is a simple pinned shield.

20 Claims, 8 Drawing Sheets

(56) References Cited

U.S. PATENT DOCUMENTS 8,437,106 B2 * 5/2013 Yanagisawa ........... H10N 50/10 360/324.12
8,514,524 B2 8/2013 Wu et al.
8,749,926 B1 * 6/2014 Le .......................... B82Y 10/00 360/324.12
8,760,820 B1 * 6/2014 McKinlay ............ G11B 5/3932 360/324.12
8,797,692 B1 8/2014 Guo et al.
8,873,204 B1 * 10/2014 Gao ..................... G11B 5/3912 360/319
8,879,213 B2 * 11/2014 Isowaki .................... G11B 5/11 360/319
9,042,058 B1 5/2015 Li et al.
9,087,527 B1 7/2015 Li et al.
9,165,574 B2 10/2015 Covington et al.
9,230,575 B2 * 1/2016 Singleton ............... G11B 5/398
9,269,383 B1 2/2016 Hattori et al.
9,280,992 B1 * 3/2016 Jiang .................... G11B 5/3932
9,324,342 B2 4/2016 Sapozhnikov et al.
9,390,735 B1 * 7/2016 Wang ..................... G11B 5/398
9,437,251 B1 9/2016 Rudy et al.
9,679,591 B1 * 6/2017 Hao ..................... G11B 5/3954
9,786,301 B1 10/2017 Li et al.
10,614,838 B2 * 4/2020 Sapozhnikov ......... G11B 5/398
10,777,222 B1 9/2020 Liu et al.
11,514,935 B1 * 11/2022 Liu ........................... G11B 5/11
2012/0087045 A1 * 4/2012 Yanagisawa ......... G11B 5/3912 360/294
2015/0170686 A1 * 6/2015 Singleton ............. G11B 5/3916 428/811.2
2016/0005424 A1 1/2016 McKinlay et al.
2017/0154641 A1 * 6/2017 Hao ..................... G11B 5/3977
2017/0243604 A1 * 8/2017 Sugawara ............ G11B 5/3954
2021/0390978 A1 12/2021 Hu et al.
2024/0144960 A1 * 5/2024 Le ........................ G11B 5/3912
2024/0233762 A1 * 7/2024 Liu ...................... G11B 5/3932

OTHER PUBLICATIONS

Devolder, T. et al., "Annealing stability of magnetic tunnel junctions based on dual MgO free layers and [Co/Ni] based thin synthetic antiferromagnet fixed system", Journal of Applied Physics, Mar. 2017, pp. 1-5, <https://arxiv.org/pdf/1703.07154>.

* cited by examiner

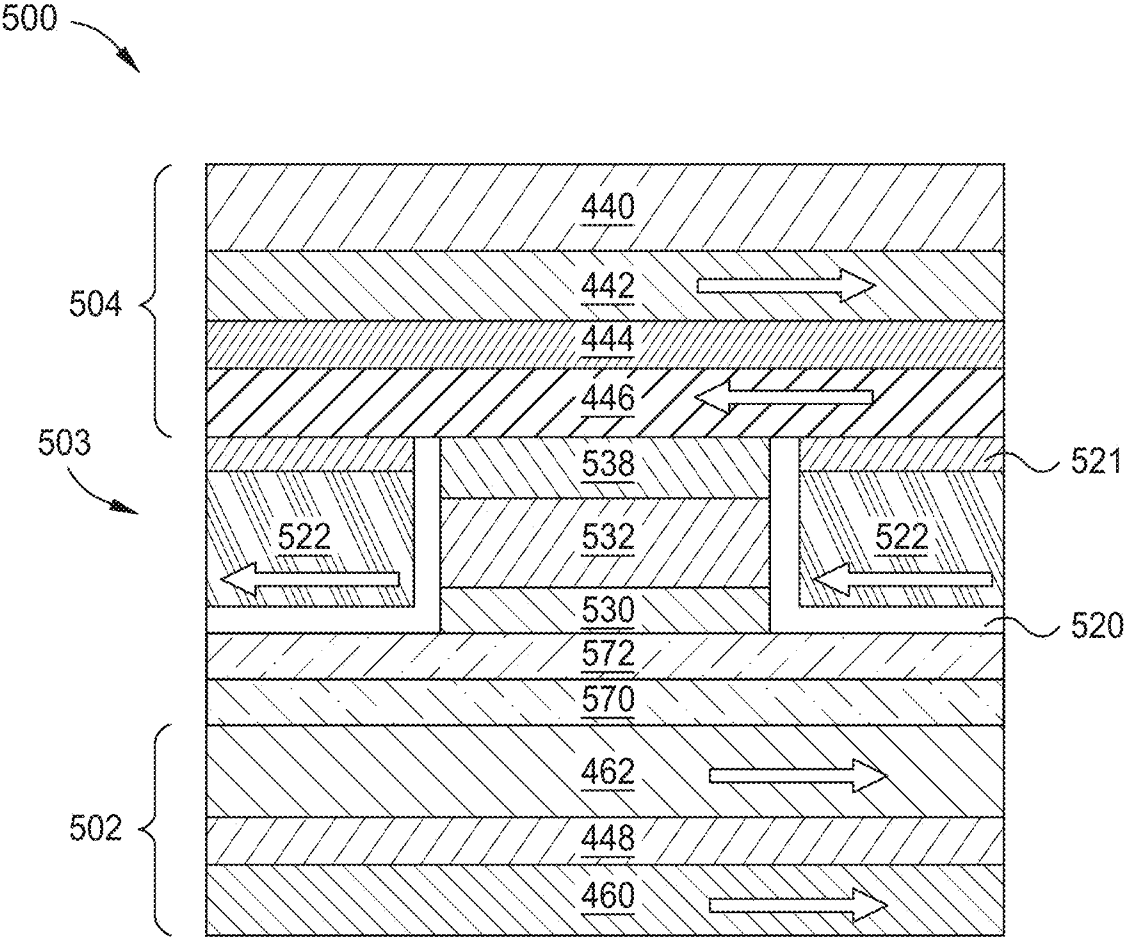
FIG. 5
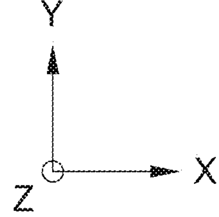

FIG. 6D 775
8
6
4
2
0
-2
-4
-6
-8
-1000
-800
-600
-400
-200
0
200
400
600
800
1000
2m_FM2
2m_FM1
m (memu)
H (Oe)

SHIELD DESIGNS FOR TWO DIMENSIONAL MAGNETIC RECORDING READ HEADS

BACKGROUND OF THE DISCLOSURE

Field of the Disclosure

Embodiments of the present disclosure generally relate to a two dimensional magnetic recording (TDMR) read head.

Description of the Related Art

Two dimensional magnetic recording (TDMR) read heads generally have a first sensor, oftentimes referred to as a lower reader and a second sensor, oftentimes referred to as an upper reader. The readers each have lower and upper shields with a middle shield therebetween. Both the top reader and the bottom reader are substantially identical, each comprising either a single free layer (SFL) or two free layers to be dual free layer (DFL) readers or sensors. In DFL reader operation, the two free layers of each reader are individually stabilized longitudinally by an anti-ferromagnetically coupled (AFC) soft bias (SB) side shields and biased transversally by a permanent magnet or a rear hard bias (RHB) structure from the stripe back edge of the sensor.

DFL TDMR read heads generally comprise two sets of SB side shields disposed on either side of the two free layers with a synthetic antiferromagnetic (SAF) layer disposed therebetween. The magnetization direction of the two SB side shields should be anti-parallel. However, the magnetization direction of the lower, middle, and upper shields may affect the magnetization direction of the two SB side shields due to the SAF layer between the two sets of SB side shields. If the magnetization direction of the two sets of SB side shields is incorrect, the read head may cease to operate as intended.

Therefore, there is a need in the art for a TDMR read head having improved shields.

SUMMARY OF THE DISCLOSURE

The present disclosure generally relates to a two dimensional magnetic recording (TDMR) read head. The read head comprises a lower shield, a lower sensor disposed on the lower shield, a middle shield disposed over the lower sensor, an upper sensor disposed on the middle shield, and an upper shield disposed over the upper sensor. In one embodiment, the middle shield is a simple pinned shield comprising a first ferromagnetic (FM) layer, an antiferromagnetic (AFM) layer disposed on the first FM layer, and a second FM layer disposed on the AFM layer, and the upper shield is a synthetic antiferromagnetic (SAF) pinned shield comprising a first pinned layer, an antiferromagnetic coupling (AFC) layer, such as Ru, disposed on the first pinned layer, and a second pinned layer disposed on the AFC layer. In another embodiment, the middle shield is a SAF pinned shield and the upper shield is a simple pinned shield.

In one embodiment, a two dimensional magnetic recording (TDMR) read head comprises a first shield, a first sensor disposed over the first shield, a middle shield disposed over the first sensor, the middle shield comprising a first ferromagnetic (FM) layer, an antiferromagnetic (AFM) layer disposed on the first FM layer, and a second FM layer disposed on the AFM layer, a second sensor disposed over the middle shield, and a second shield disposed over the second sensor, the second shield comprising a first pinned layer, an antiferromagnetic coupling (AFC) layer disposed on the first pinned layer, and a second pinned layer disposed on the AFC layer.

In another embodiment, a two dimensional magnetic recording (TDMR) read head comprises a first shield, a first sensor disposed over the first shield, a middle shield disposed over the first sensor, the middle shield comprising a first pinned layer, an antiferromagnetic coupling (AFC) layer disposed on the first pinned layer, and a second pinned layer disposed on the AFC layer, a second sensor disposed over the middle shield, and a second shield disposed over the second sensor, the second shield comprising a first ferromagnetic (FM) layer, an antiferromagnetic (AFM) layer disposed on the first FM layer, and a second FM layer disposed on the AFM layer.

In yet another embodiment, a two dimensional magnetic recording (TDMR) read head comprises a first shield, a first dual free layer (DFL) sensor disposed over the first shield, a middle shield disposed over the first sensor, the middle shield comprising a first ferromagnetic (FM) layer, an antiferromagnetic (AFM) layer disposed on the first FM layer, and a second FM layer disposed on the AFM layer, wherein a magnetization direction of the first FM layer is parallel to a magnetization direction of the second FM layer, a second DFL sensor disposed over the middle shield, and a second shield disposed over the second sensor, the second shield comprising a first pinned layer, an AFC layer disposed on the first pinned layer, and a second pinned layer disposed on the AFC layer, wherein a magnetization direction of the first pinned layer is anti-parallel to the magnetization direction of the first FM layer.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 5 illustrates a MFS view of a read head, according to one embodiments.

FIGS. 6A-6D illustrate simple pinned shields, according to various embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a two dimensional magnetic recording (TDMR) read head. The read head comprises a lower shield, a lower sensor disposed on the lower shield, a middle shield disposed over the lower sensor, an upper sensor disposed on the middle shield, and an upper shield disposed over the upper sensor. In one embodiment, the middle shield is a simple pinned shield comprising a first ferromagnetic (FM) layer, an antiferromagnetic (AFM) layer disposed on the first FM layer, and a second FM layer disposed on the AFM layer, and the upper shield is a synthetic antiferromagnetic (SAF) pinned shield comprising a first pinned layer, an antiferromagnetic coupling (AFC) layer, such as Ru, disposed on the first pinned layer, and a second pinned ayer disposed on the AFC layer. In another embodiment, the middle shield is a SAF pinned shield and the upper shield is a simple pinned shield.

Figure 1:
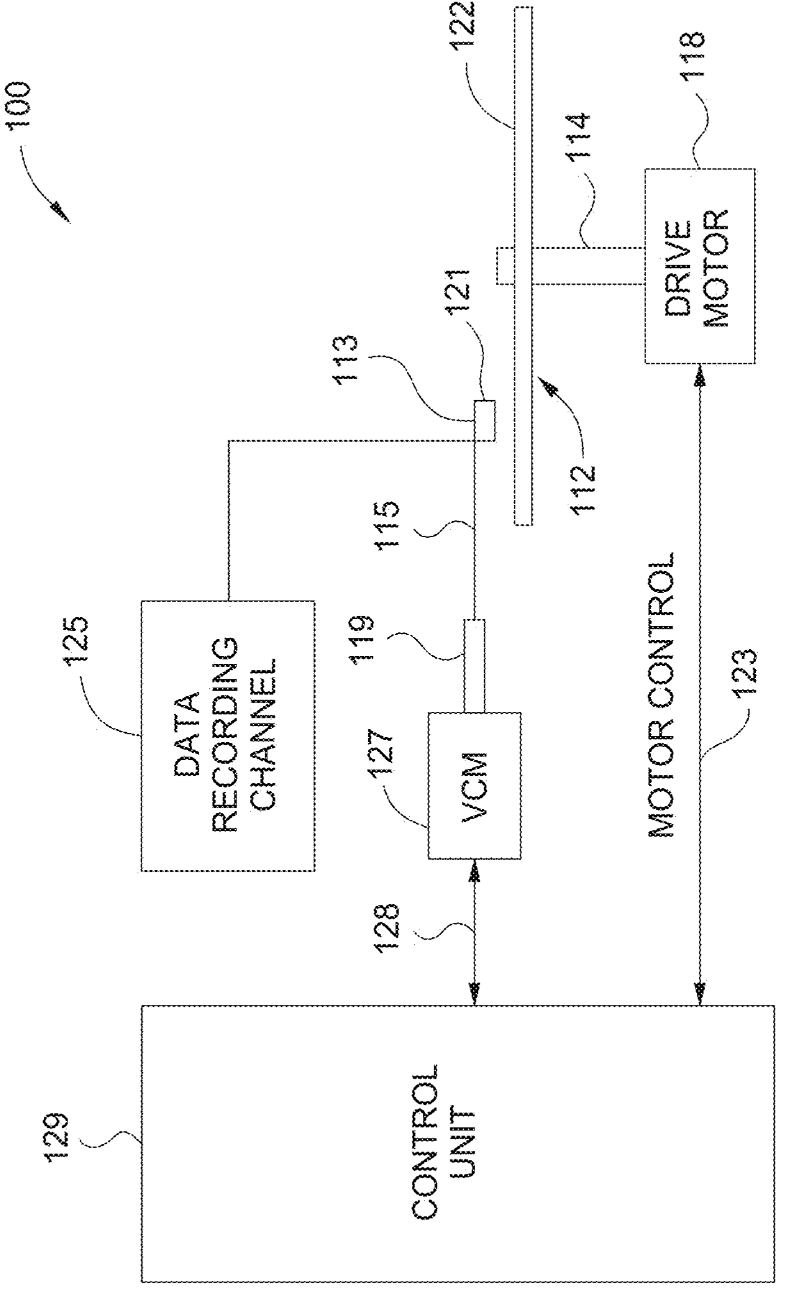
FIG. 1 is a schematic illustration of certain embodiments of a magnetic drive including a read/write head.

FIG. 1 is a schematic illustration of certain embodiments of a magnetic drive 100 including a recording head. Such a magnetic media drive may be a single drive or comprise multiple drives. For the sake of illustration, a single disk drive 100 is shown according to certain embodiments. As shown, at least one rotatable magnetic disk 112 is supported on a spindle 114 and rotated by a drive motor 118. The magnetic recording on each magnetic disk 112 is in the form of any suitable patterns of data tracks, such as annular patterns of concentric data tracks (not shown) on the magnetic disk 112.

Figure 2:
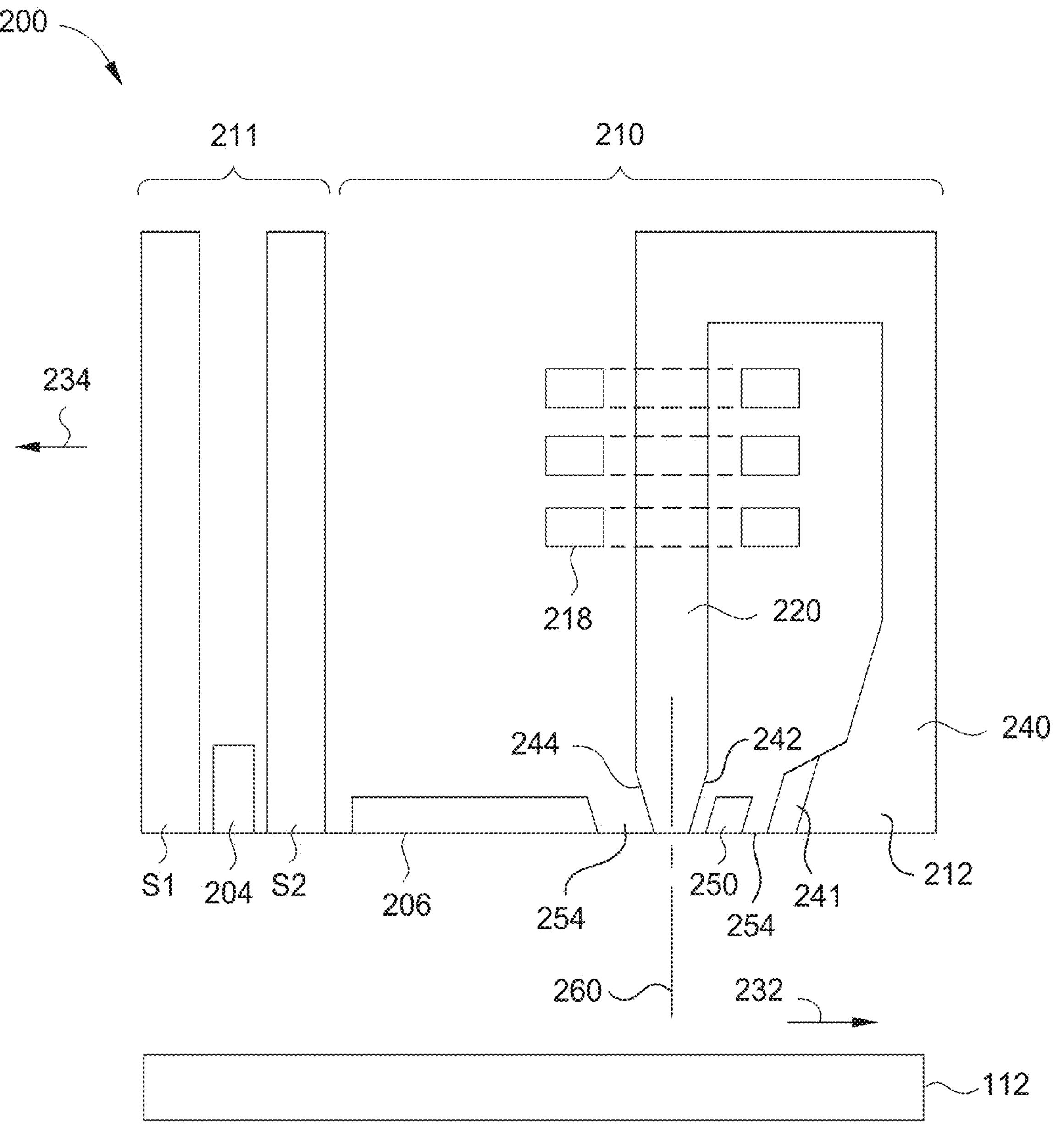
FIG. 2 is a fragmented, cross-sectional side view of certain embodiments of a read/write head.

At least one slider 113 is positioned near the magnetic disk 112, each slider 113 supporting one or more magnetic head assemblies 121. As the magnetic disk 112 rotates, the slider 113 moves radially in and out over the disk surface 122 so that the magnetic head assembly 121 may access different tracks of the magnetic disk 112 where desired data are written. Each slider 113 is attached to an actuator arm 119 by way of a suspension 115. The suspension 115 provides a slight spring force which biases the slider 113 toward the disk surface 122. Each actuator arm 119 is attached to an actuator means 127. The actuator means 127 as shown in FIG. 2 may be a voice coil motor (VCM). The VCM includes a coil movable within a fixed magnetic field, the direction and speed of the coil movements being controlled by the motor current signals supplied by control unit 129.

During operation of the disk drive 100, the rotation of the magnetic disk 112 generates an air bearing between the slider 113 and the disk surface 122 which exerts an upward force or lift on the slider 113. The air bearing thus counterbalances the slight spring force of suspension 115 and supports slider 113 off and slightly above the disk surface 122 by a small, substantially constant spacing during normal operation.

The various components of the disk drive 100 are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads on the assembly 121 by way of recording channel 125.

The above description of a typical magnetic media drive and the accompanying illustration of FIG. 1 are for representation purposes only. It should be apparent that magnetic media drives may contain a large number of media, or disks, and actuators, and each actuator may support a number of sliders.

FIG. 2 is a fragmented, cross-sectional side view of certain embodiments of a read/write head 200 having a SOT device. The read/write head 200 faces a magnetic media 112. The read/write head 200 may correspond to the magnetic head assembly 121 described in FIG. 1. The read/write head 200 includes a media facing surface (MFS) 212, such as a gas bearing surface, facing the disk 112, a write head 210, and a magnetic read head 211. As shown in FIG. 2, the magnetic media 112 moves past the write head 210 in the direction indicated by the arrow 232 and the read/write head 200 moves in the direction indicated by the arrow 234.

In some embodiments, the magnetic read head 211 is a magnetoresistive (MR) read head that includes an MR sensing element 204 located between MR shields S1 and S2. In other embodiments, the magnetic read head 211 is a magnetic tunnel junction (MTJ) read head that includes a MTJ sensing device 204 located between MR shields S1 and S2. The magnetic fields of the adjacent magnetized regions in the magnetic disk 112 are detectable by the MR (or MTJ) sensing element 204 as the recorded bits. The TDMR device of various embodiments can be incorporated into the read head 211 as the sensing element.

The write head 210 includes a main pole 220, a leading shield 206, a trailing shield 240, an optional spin torque oscillator (STO) device, spintronic or conductive device 250, and a coil 218 that excites the main pole 220. The coil 218 may have a "pancake" structure which winds around a back-contact between the main pole 220 and the trailing shield 240, instead of a "helical" structure shown in FIG. 2. When included, e.g., to achieve a Microwave Assisted Magnetic Recording (MAMR) or enhanced Perpendicular Magnetic Recording (ePMR) effect, the STO, spintronic or conductive device 250 is formed in a gap 254 between the main pole 220 and the trailing shield 240. In certain embodiments, the read/write head 200 additionally includes mechanisms (not shown) for supporting Heat Assisted Magnetic Recording (HAMR), which may include a waveguide coupled to a light source and a near field transducer (NFT) placed adjacent to the main pole 220 and coupled to the waveguide to convert the delivered light into a heating spot on the media. The main pole 220 includes a trailing taper 242 and a leading taper 244. The trailing taper 242 extends from a location recessed from the MFS 212 to the MFS 212. The leading taper 244 extends from a location recessed from the MFS 212 to the MFS 212. The trailing taper 242 and the leading taper 244 may have the same degree of taper, and the degree of taper is measured with respect to a longitudinal axis 260 of the main pole 220. In some embodiments, the main pole 220 does not include the trailing taper 242 and the leading taper 244. Instead, the main pole 220 includes a trailing side (not shown) and a leading side (not shown), and the trailing side and the leading side are substantially parallel. The main pole 220 may be a magnetic material, such as a FeCo alloy. The leading shield 206 and the trailing shield 240 may be a magnetic material, such as a NiFe alloy.

Figure 3:
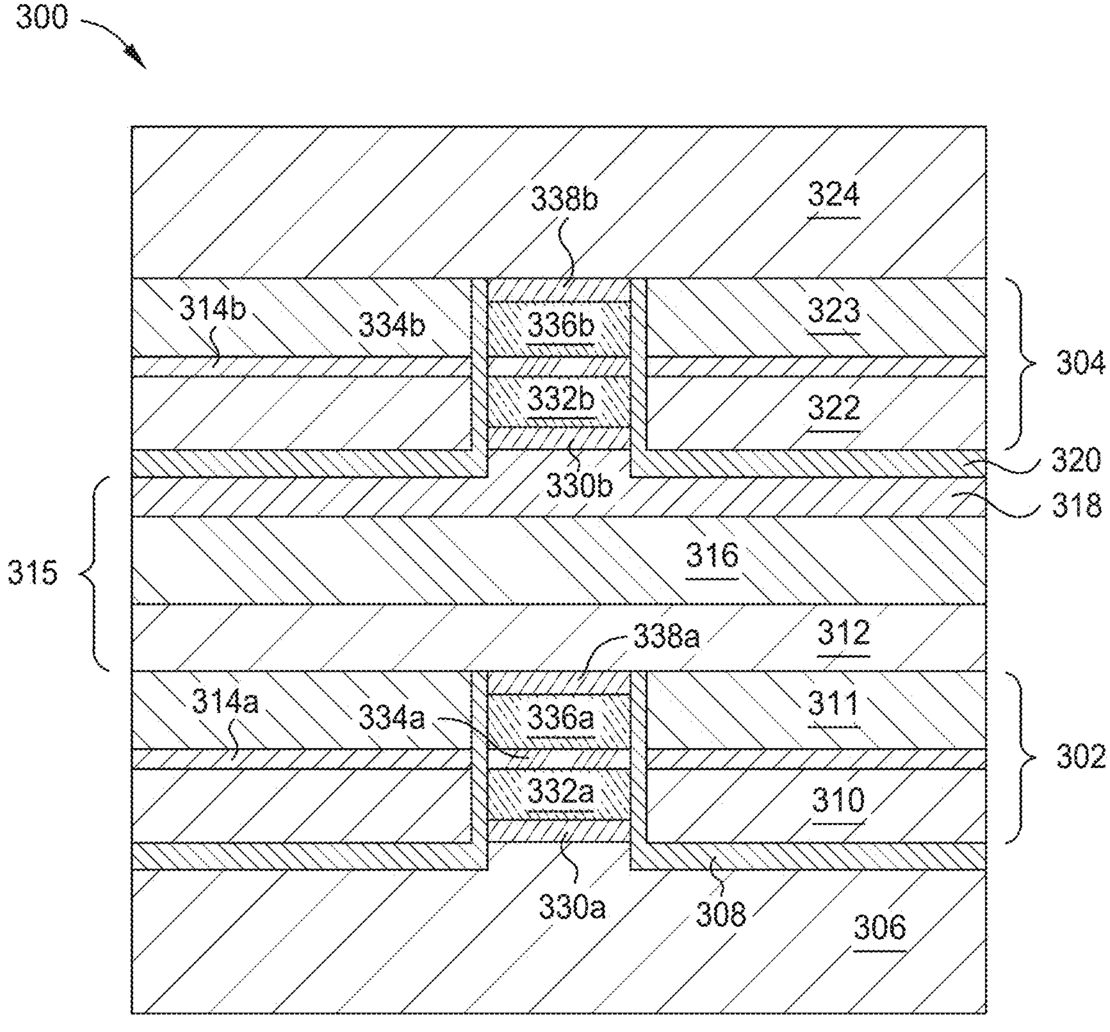
FIG. 3 illustrates a MFS of a dual free layer (DFL) two dimensional magnetic recording (TDMR) read head comprising two sensors or readers, according to one embodiment.
Figure 3:
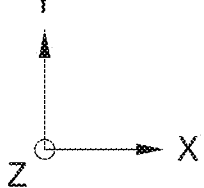

FIG. 3 illustrates an MFS of a dual free layer (DFL) two dimensional magnetic recording (TDMR) read head 300 comprising two sensors or readers 302, 304, according to one embodiment. The read head 300 may correspond to, or be a part of, the magnetic head assembly 121 described in FIG. 1. The read head 300 may correspond to, or be a part of, the read/write head 200 described in FIG. 2, such as the magnetic read head 211.

The DFL TDMR read head 300 comprises a first lower shield 306, a first insulation layer 308 disposed on the first shield 306, a first sensor or reader 302 disposed on the first lower shield 306 between portions of the first insulation layer 308, a first upper shield 312 disposed over the first sensor 302, a read separation gap (RSG) 316 disposed on the first upper shield 312, a second lower shield 318 disposed on the RSG 316, a second insulation layer 320 disposed on the second lower shield 318, a second sensor or reader 304 disposed on the second lower shield 318 between portions of the second insulation layer 320, and a second upper shield 324 disposed over the second sensor 304. The RSG 316 may comprise AlOx, where x is an integer greater than or equal to 1. The first and second sensors 302, 304 may each individually be tunnel magnetoresistance (TMR) sensors or magnetic tunnel junction (MTJ) sensors. The first and second sensors 302, 304 may be interchangeably referred to as a first reader 302 and a second reader 304 throughout. The first upper shield 312, the RSG 316, and the second lower shield 318 may collectively be referred to herein as middle shields 315, as discussed further below.

The first reader 302 comprises a seed layer 330*a*, a first free layer 332*a* disposed on the seed layer 330*a*, a barrier layer 334*a* disposed on the first free layer 332*a*, a second free layer 336*a* disposed on the barrier layer 334*a*, and a cap layer 338*a* disposed on the second free layer 336*a*. The second reader 304 comprises a seed layer 330*b*, a first free layer 332*b* disposed on the seed layer 330*b*, a barrier layer 334*b* disposed on the first free layer 332*b*, a second free layer 336*b* disposed on the barrier layer 334*b*, and a cap layer 338*b* disposed on the second free layer 336*b*. While not shown, a rear bias may be disposed behind the first reader 302, recessed from the MFS.

First soft bias layers 310 are disposed on the first insulation layer 308 for the first reader 302 and an anti-ferromagnetically coupled (AFC) layer 314*a* is disposed between the first soft bias layers 310 and second soft bias layers 311. The first and second soft bias layers 310, 311 are disposed on either side of the sensor 302 in the x-direction. Similarly, first soft bias layers 322 are disposed on the first second insulation layer 320 for the second reader and an AFC layer 314*b* is disposed between the first soft bias layers 322 and second soft bias layers 323. The first and second soft bias layers 322, 323 are disposed on either side of the second sensor 304 in the x-direction. While not shown, a rear bias may be disposed behind the second reader 304, recessed from the MFS.

The first upper shield 312 and the second upper shield 324 connect seamlessly to the second soft bias layers 311, 323, respectively. The first insulation layer 308 extends in the y-direction on each side of the first sensor 302 to prevent the first sensor 302 from contacting the first soft bias layer 310, the AFC layer 314*a*, and the second soft bias layer 311. Similarly, the second insulation layer 320 extends in the y-direction on each side of the second sensor 304 to prevent the second sensor 304 from contacting the second soft bias layer 322, and the AFC layer 314*b*, and the second soft bias layer 323. The AFC layers 314*a* and 314*b* comprise Ru or a CoFe/Ru/CoFe tri-layer.

Figures 4A, 4B:
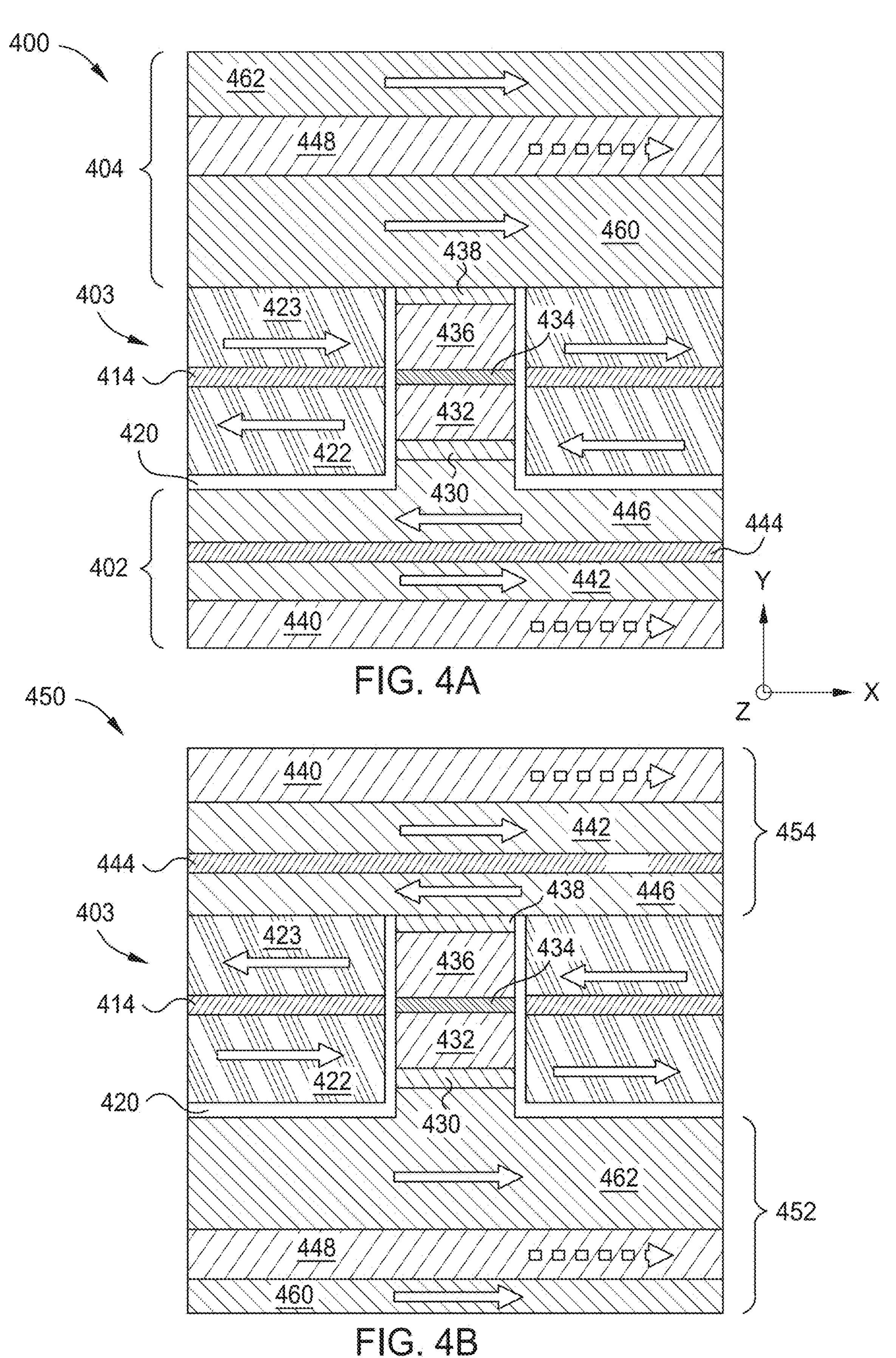
FIGS. 4A-4B illustrate MFS views of portions of a read head, respectively, according to various embodiments.

FIGS. 4A-4B illustrate MFS views of a portion 400, 450 of a read head, respectively, according to various embodiments. The portions 400, 450 may each individually be portions of the TDMR read head 300 of FIG. 3. The portions 400, 450 may each individually correspond to, or be a part of, the magnetic head assembly 121 described in FIG. 1. The portions 400, 450 may each individually correspond to, or be a part of, the read/write head 200 described in FIG. 2, such as the magnetic read head 211.

In FIG. 4A, the portion 400 comprises a first shield 402, a reader 403 disposed over the first shield 402, and a second shield 404 disposed over the reader 403. In one embodiment, the first shield 402 is the middle shield 315 of the read head 300 of FIG. 3, the second shield 404 is the second upper shield 324 of the read head 300 of FIG. 3, and the reader 403 is the second reader 304 of the read head 300 of FIG. 3. In another embodiment, the first shield 402 is the first lower shield 306 of the read head 300 of FIG. 3 and the second shield 404 is the middle shield 315 of the read head 300 of FIG. 3. In such an embodiment, the second upper shield 324 may comprise the same materials as the first shield 402.

In FIG. 4B, the portion 450 comprises a first shield 452, the sensor or reader 403 disposed over the first shield 452, and a second shield 454 disposed over the reader 403. In one embodiment, the first shield 452 is the middle shield 315 of the read head 300 of FIG. 3, the second shield 454 is the second upper shield 324 of the read head 300 of FIG. 3, and the reader 403 is the second reader 304 of the read head 300 of FIG. 3. In another embodiment, the first shield 452 is the first lower shield 306 of the read head 300 of FIG. 3, and the second shield 454 is the middle shield 315 of the read head 300 of FIG. 3. In such an embodiment, the second upper shield 324 may comprise the same materials as the first shield 452.

In FIGS. 4A and 4B, the sensor or reader 403 comprises a seed layer 430, a first free layer 432 disposed on the seed layer 430, a barrier layer 434 disposed on the first free layer 432, a second free layer 436 disposed on the barrier layer 434, and a cap layer 438 disposed on the second free layer 436. First soft bias layers 422 are disposed on an insulation layer 420 and an AFC layer 414 is disposed between the first soft bias layers 422 and second soft bias layers 423. The first and second soft bias layers 422, 423 are disposed on either side of the reader 403 in the x-direction. While not shown, a rear bias may be disposed behind the reader 403, recessed from the MFS. The reader 403 may comprise any materials listed above in FIG. 3.

In FIG. 4A, the first shield 402 comprises an antiferromagnetic (AFM) layer 440, a first pinned layer 442 disposed on the AFM layer 440, an antiferromagnetic coupling (AFC) layer 444 disposed on the first pinned layer 442, and a second pinned layer 446 disposed on the AFC layer 444. The first and second pinned layers 442, 446 are pinned to have anti-parallel magnetization directions. The second pinned layer 446 has a magnetization direction parallel to the magnetization direction of the first soft bias layers 422. The AFM layer 440 may comprise IrMn and have a thickness in the y-direction of about 4 nm to about 10 nm, the AFC layer 444 may comprise Ru or Ir and have a thickness in the y-direction of about 0.4 nm to about 1.2 nm, and the first and second pinned layers 442, 446 may each individually comprise NiFe, Ni, Co, Fe, or CoFe and have a thickness in the y-direction of about 8 nm to about 12 nm. The first shield 402 may be referred to herein as a pinned SAF shield.

The second shield 404 comprises a first ferromagnetic (FM1) layer 460, an AFM layer 448 disposed on the FM1 layer 460, and a second ferromagnetic (FM2) layer 462 disposed on the AFM layer 448. The second shield 404 may comprise additional materials, as discussed below in FIGS. 6A-6D. The FM1 460 and FM2 462 may each individually comprise NiFe, or NiFe and one or more of CoFe and Co with individual thickness of about 5 nm to about 20 nm, and the AFM layer 448 may comprise IrMn. The FM1 460 has a magnetization direction anti-parallel to the second pinned layer 446. The FM1 460 and the FM2 462 have parallel magnetization directions. The FM1 460 has a magnetization direction parallel to the magnetization direction of the second soft bias layers 423. The second shield 404 may be referred to herein as a simple pinned shield.

In FIG. 4B, the first shield 452 comprises the FM1 layer 460, the AFM layer 448 disposed on the FM1 460, and the FM2 layer 462 disposed on the AFM layer 448. The first shield 452 may comprise additional materials, as discussed below in FIGS. 6A-6D. The FM1 460 and the FM2 462 have parallel magnetization directions. The FM2 462 has a magnetization direction parallel to the magnetization direction of the first soft bias layers 422. The first shield 452 may be referred to herein as a simple pinned shield.

The second shield 454 comprises the second pinned layer 446 disposed over the reader 403, the AFC layer 444 disposed on the second pinned layer 446, the first pinned layer 442 disposed on the AFC layer 444, and the AFM layer 440 disposed on the first pinned layer 442. The first and second pinned layers 442, 446 are pinned to have anti-parallel magnetization directions. The FM1 460 has a magnetization direction anti-parallel to the second pinned layer 446. The first pinned layer 446 has a magnetization direction parallel to the magnetization direction of the second soft bias layers 423. The second shield 454 may be referred to herein as a pinned SAF shield.

The FM1 layer 460 and the FM2 layer 462 are independently pinned, and thus, can have different exchange coupling energies depending on the composition of the FM1 and FM2 layers 460, 462. As such, the exchange coupling energies of the FM1 and FM2 layer 460, 462 can be independently tuned while maintaining the permeability of the shield. Utilizing a pinned SAF shield and a simple pinned shield with uniaxial exchange bias direction of the AFM layers set in a single annealing operation allows for the alignment of the SB layers 422, 423 of the reader 403 to be in the correct directions.

FIG. 5 illustrates an MFS view of a read head 500, according to one embodiment. The read head 500 may correspond to, or be a part of, the magnetic head assembly 121 described in FIG. 1. The read head 500 may correspond to, or be a part of, the read/write head 200 described in FIG. 2, such as the magnetic read head 211. While shown as a single read head 500, the read head 500 may be part of a TDMR read head, like shown in FIG. 3.

The read head 500 comprises a first shield 502, a second shield 504 disposed over the first shield 502, and a reader 503 disposed between the first shield 502 and the second shield 504. In one embodiment, the first shield 502 is the middle shield 315 of the read head 300 of FIG. 3, the second shield 504 is the second upper shield 324 of the read head 300 of FIG. 3. In another embodiment, the first shield 502 is the first lower shield 306 of the read head 300 of FIG. 3, and the second shield 504 is the middle shield 315 of the read head 300 of FIG. 3. In such an embodiment, the second upper shield 324 may comprise the same materials as the first shield 502.

The sensor or reader 503 is similar to the sensor or reader 403 of FIGS. 4A-4B; however, the reader 503 comprises only one free layer 532. The reader 503 comprises a spacer layer 530, a free layer 532, and a capping layer 538. The spacer layer 530 may comprise an insulating material such as MgO or alumina or a metal layer such as Cu, Ag, or AgSn, etc. A buffer layer 570 is disposed on the first shield 502, and a pinned layer 572 is disposed on the buffer layer 570 adjacent to the spacer layer 530. The pinned layer 572 may be a ferromagnetic layer, an SAF layer pinned by AFM materials, or a self-pinned layer. The pinned layer 572 may comprise a material selected from the group consisting of: magnetic materials, such as Ni, Co, Fe, alloys thereof; magnetic alloys comprising boron; non-magnetic materials, such as a Ru AFC layer; and AFM materials, such as IrMn. The buffer layer 572 may comprise non-magnetic materials, such as Ta and Ru. FM layers 522 are disposed on an insulation layer 520, and the FM layers 522 are disposed on either side of the reader 503 in the x-direction. The FM layers 522 may comprise Ni, Fe, Co, NiFe, NiFeCo, NiCo, CoFe, or combinations thereof. Capping layer 521 are disposed on the FM layers 522, and the capping layers 521 may comprise a multiple layered structure comprising one or combination of a Ta layer, an Ir layer, a Cr layer, a Ti layer, and a Ru layer. The various layers of reader 503 may comprise any materials listed for corresponding layers discussed above in FIG. 3.

The first shield 502 comprises the FM1 layer 460, the AFM layer 448 disposed on the FM1 460, and the FM2 layer 462 disposed on the AFM layer 448. The first shield 502 may comprise additional materials, as discussed below in FIGS. 6A-6D. The FM1 460 and the FM2 462 have parallel magnetization directions. The first shield 502 may be referred to herein as a simple pinned shield.

The second shield 504 comprises the second pinned layer 446 disposed over the reader 503, the AFC layer 444 disposed on the second pinned layer 446, the first pinned layer 442 disposed on the AFC layer 444, and the AFM layer 440 disposed on the first pinned layer 442. The first and second pinned layers 442, 446 are pinned to have anti-parallel magnetization directions. The FM1 460 has a magnetization direction anti-parallel to the second pinned layer 446. The second shield 504 may be referred to herein as a pinned SAF shield.

FIGS. 6A-6D illustrate simple pinned shields 600, 625, 650, 675, according to various embodiments. Each simple pinned shields 600, 625, 650, 675 may be the second shield 404 of FIG. 4A, the first shield 452 of FIG. 4B, and/or the first shield 502 of FIG. 5.

Figures 6A, 6B, 6C, 6D:
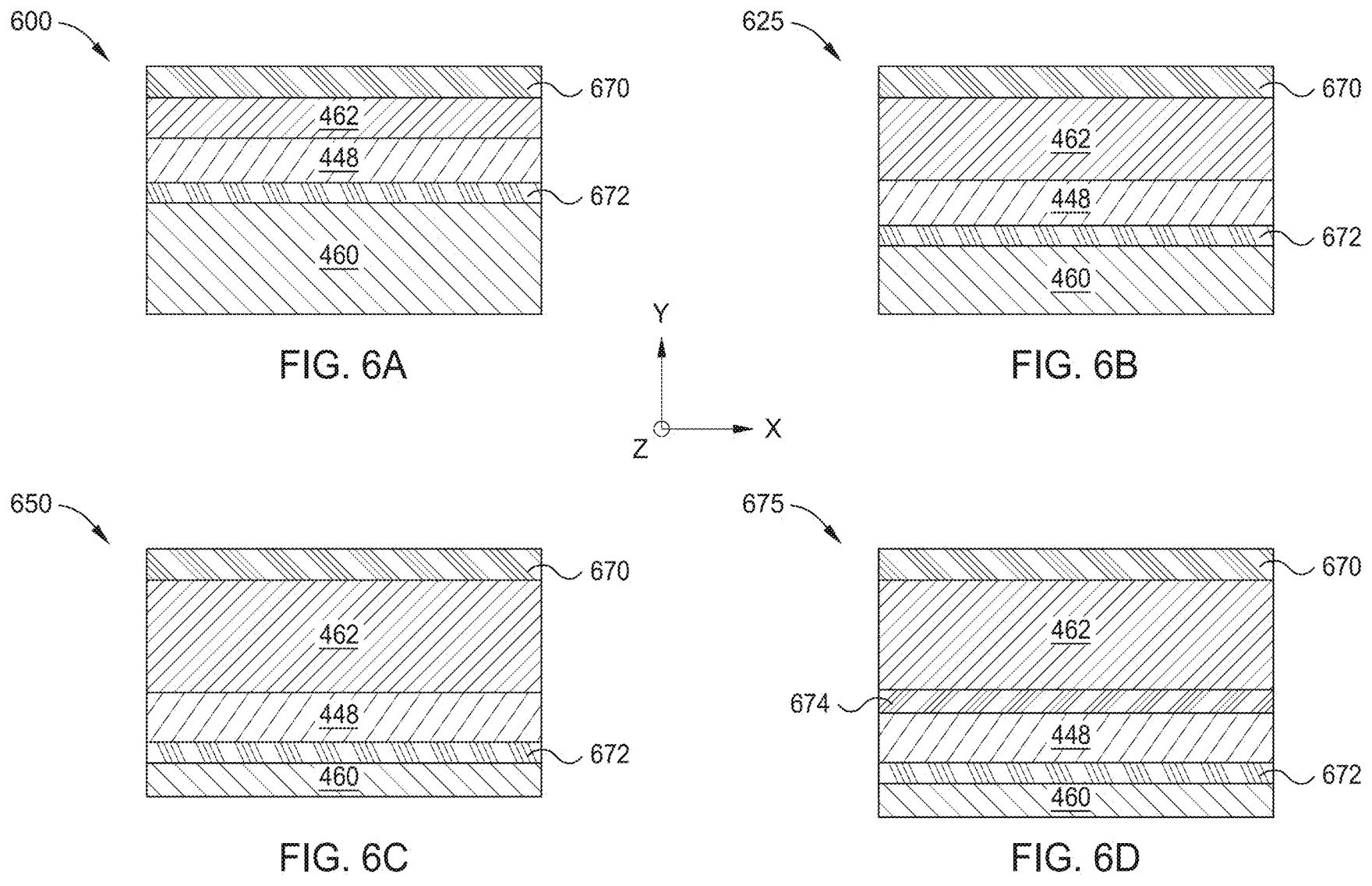

The simple pinned shield 600 of FIG. 6A comprises the FM1 layer 460, a dusting layer 672 disposed over the FM1 layer 460, the AFM layer 448 disposed over the dusting layer 672, the FM2 layer 462 disposed on the AFM layer 448, and a cap layer 670 disposed on the FM2 layer 462. The FM1 layer 460 comprises NiFe or NiFe and one or more of Ni, Fe, Co, and CoFe, and has a thickness in the y-direction of about 135 Å to about 150 Å, such as about 142 Å. The dusting layer 672 comprises Co, such as CoFe and/or Co, or Ru, and has a thickness in the y-direction of about 0.5 Å to about 25 Å. When the dusting layer 672 comprises Co, the pinning of the FM1 layer 460 is increased. When the dusting layer 672 comprises Ru, the pinning of the FM1 layer 460 is decreased. The AFM layer 448 comprises IrMn and has a thickness in the y-direction of about 50 Å to about 70 Å, such as about 60 Å. The FM2 layer 462 comprises NiFe or NiFe and one or more of Ni, Fe, Co, and CoFe, and has a thickness in the y-direction of about 45 Å to about 55 Å, such as about 50 Å. The cap layer 670 comprises Ta, Ru, or NiCr and has a thickness in the y-direction of about 15 Å to about 25 Å, such as about 20 Å.

The simple pinned shield 625 of FIG. 6B is similar to the simple pinned shield 600 of FIG. 6A; however, the thicknesses of the various layers are different. The FM1 layer 460 has a thickness in the y-direction of about 85 Å to about 100 Å, such as about 92 Å. The dusting layer 672 has a thickness in the y-direction of about 0.5 Å to about 25 Å. The AFM layer 448 has a thickness in the y-direction of about 50 Å to about 70 Å, such as about 60 Å. The FM2 layer 462 has a thickness in the y-direction of about 90 Å to about 110 Å, such as about 100 Å. The cap layer 670 has a thickness in the y-direction of about 15 Å to about 25 Å, such as about 20 Å.

The simple pinned shield 650 of FIG. 6C is similar to the simple pinned shield 600 of FIG. 6A and the simple pinned shield 625 of FIG. 6B; however, the thicknesses of the various layers are different. The FM1 layer 460 has a thickness in the y-direction of about 35 Å to about 50 Å, such as about 42 Å. The dusting layer 672 has a thickness in the y-direction of about 0.5 Å to about 25 Å. The AFM layer 448 has a thickness in the y-direction of about 50 Å to about 70 Å, such as about 60 Å. The FM2 layer 462 has a thickness in the y-direction of about 140 Å to about 160 Å, such as about 150 Å. The cap layer 670 has a thickness in the y-direction of about 15 Å to about 25 Å, such as about 20 Å.

The simple pinned shield 675 of FIG. 6D is similar to the simple pinned shield 600 of FIG. 6A, the simple pinned shield 625 of FIG. 6B, and the simple pinned shield 650 of FIG. 6C; however, the thicknesses of the various layers are different and the simple pinned shield 675 comprises a second dusting layer 674. The first and second dusting layers 672, 674 each individually comprises CoFe and/or Co, and has a thickness in the y-direction of about 0.5 Å to about 25 Å. When the second dusting layer 672 comprises Co and/or CoFe, the pinning of the FM2 layer 462 is increased. In some embodiments, the first dusting layer 672 comprises a bilayer of CoFe and Co, where Co bilayer is disposed in contact with the AFM layer 448, and the second dusting layer 674 comprises a bilayer of Co and CoFe, where the Co bilayer is disposed in contact with the AFM layer 448. The FM1 layer 460 has a thickness in the y-direction of about 35 Å to about 50 Å, such as about 42 Å. The AFM layer 448 has a thickness in the y-direction of about 50 Å to about 70 Å, such as about 60 Å. The FM2 layer 462 has a thickness in the y-direction of about 115 Å to about 135 Å, such as about 126 Å. The cap layer 670 has a thickness in the y-direction of about 15 Å to about 25 Å, such as about 20 Å.

By varying the thickness of the FM1 layer 460 and the location of the AFM layer 448, the pinning field strength of the FM1 layer 460 varies, as shown in FIGS. 7A-7D below. For example, by decreasing the thickness of the FM1 layer 460, the pinning strength increases while maintaining shield permeability.

Figure 7A:
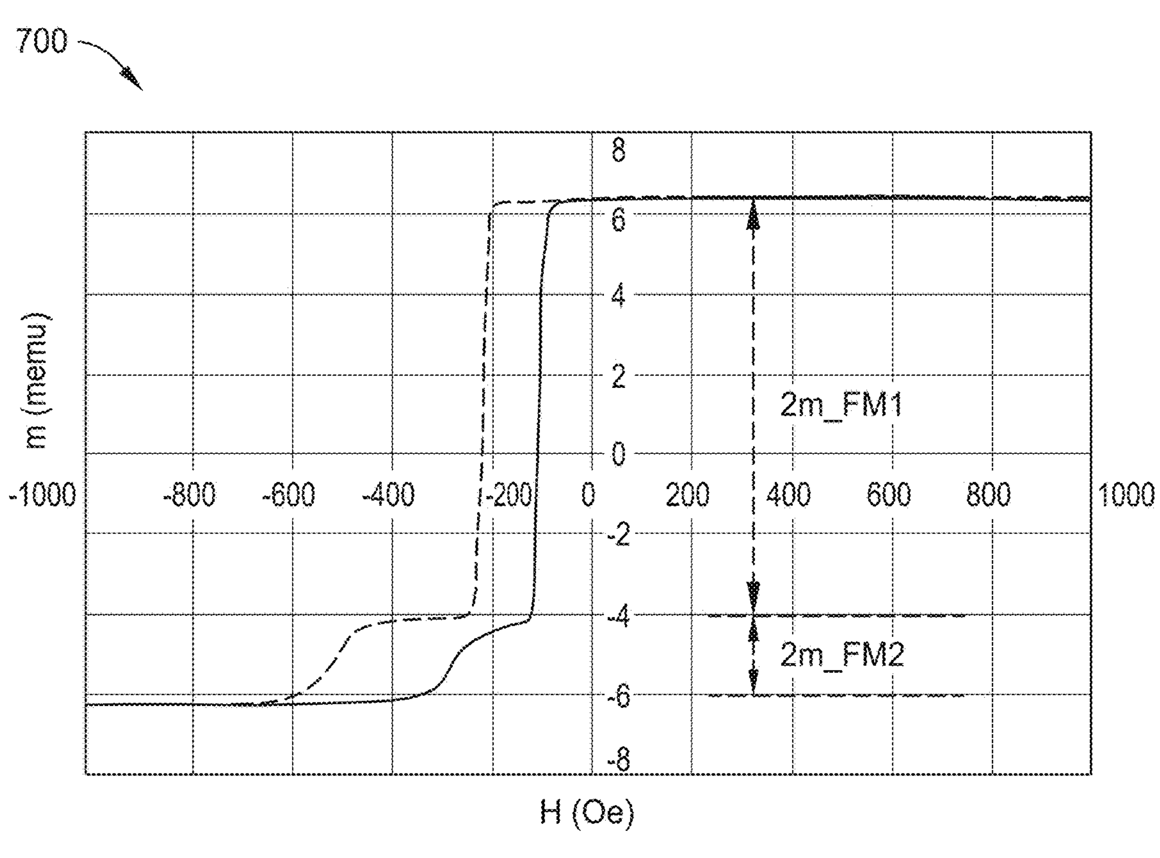
FIGS. 7A-7D illustrate magnetic hysteresis (MH) loops, according to various embodiments.
Figure 7B:
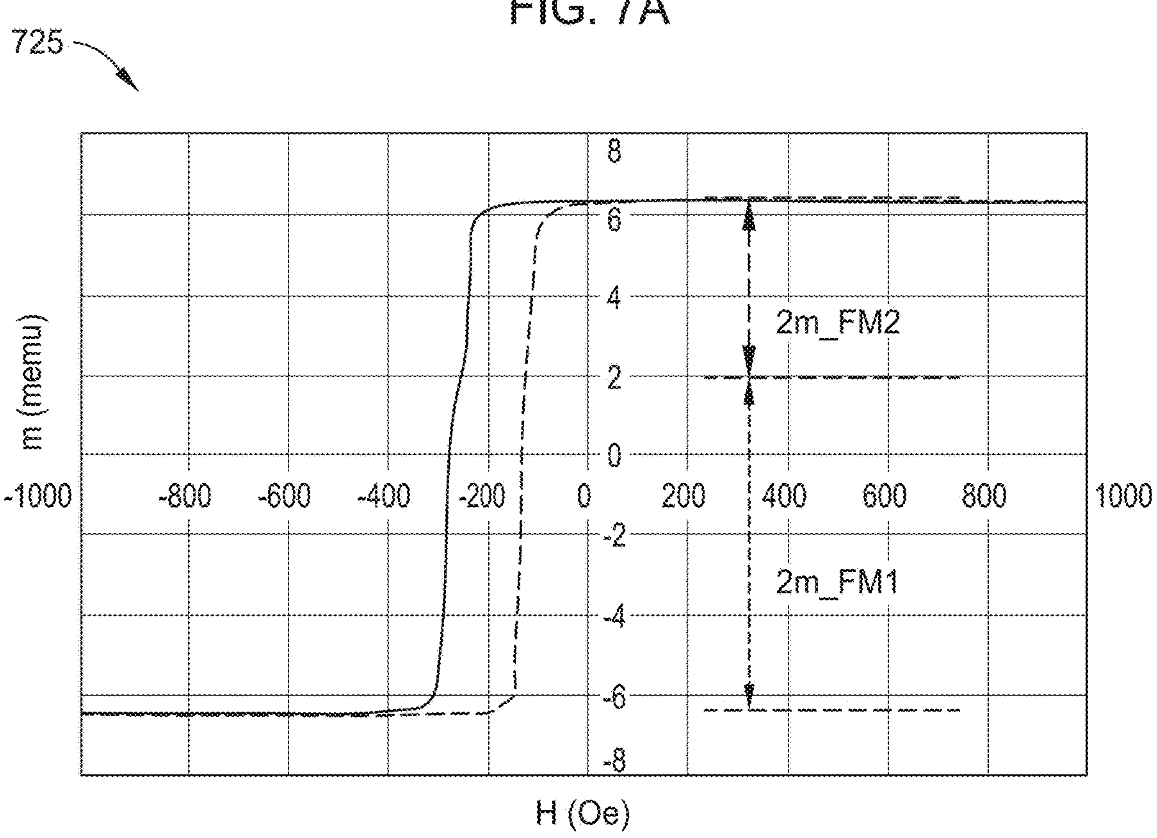
Figures 7C, 7D:
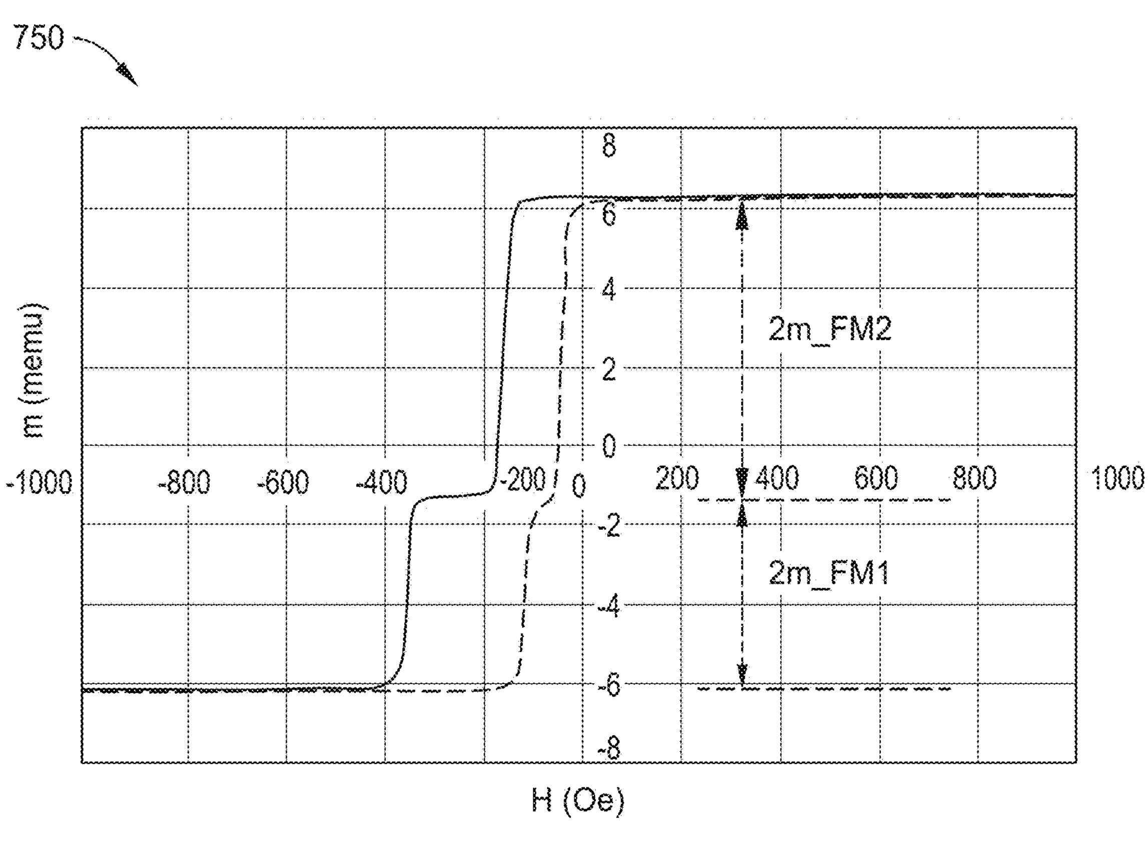

FIGS. 7A-7D illustrate magnetic hysteresis (MH) loops 700, 725, 750, 775, according to various embodiments. The MH loop 700 of FIG. 7A represents the simple pinned shield 600 of FIG. 6A, the MH loop 725 of FIG. 7B represents the simple pinned shield 625 of FIG. 6B, the MH loop 750 of FIG. 7C represents the simple pinned shield 650 of FIG. 6C, and the MH loop 775 of FIG. 7D represents the simple pinned shield 675 of FIG. 6D.

As shown in the MH loop 700, when the FM1 layer 460 has a greater thickness than the FM2 layer 462, the exchange coupling field of the FM1 layer 460 is less than that of the FM2 layer. In the MH loop 725, when the thickness of the FM1 layer 460 and the thickness of the FM2 layer 462 are substantially equal, the exchange coupling field of the FM1 and FM2 layers 460, 462 is nearly equal. In the MH loops 750, 775, when the thickness of the FM1 layer 460 is less than the thickness of the FM2 layer 462, the exchange coupling field of the FM1 460 is greater than the exchange coupling field of the FM2 layers 462. In the MH loop 775, the exchange field of the FM1 and FM2 layers 460, 462 is nearly equal despite the FM1 and FM2 layers 460, 462 having different thicknesses due to the second dusting layer 674 comprising CoFe. Comparing the MH loops 700-775 shows how the exchange coupling of the FM1 and FM2 layers 460, 462 can be independently tuned.

Because the FM1 layer and the FM2 layer are independently pinned, the FM1 and FM2 layers have different exchange coupling energies that can be independently tuned while maintaining the permeability of the shield. Utilizing a pinned SAF shield and a simple pinned shield allows for the alignment of the SB layers of the reader or sensor to be in the correct directions. Furthermore, utilizing the simple pinned shield as the topmost shield over the second sensor in a TDMR head, the TDMR head has a reduced signal-to-noise ratio.

In one embodiment, a two dimensional magnetic recording (TDMR) read head comprises a first shield, a first sensor disposed over the first shield, a middle shield disposed over the first sensor, the middle shield comprising a first ferromagnetic (FM) layer, an antiferromagnetic (AFM) layer disposed on the first FM layer, and a second FM layer disposed on the AFM layer, a second sensor disposed over the middle shield, and a second shield disposed over the second sensor, the second shield comprising a first pinned layer, an antiferromagnetic coupling (AFC) disposed on the first pinned layer, and a second pinned layer disposed on the AFC layer.

A magnetization direction of the second FM layer is anti-parallel to a magnetization direction of the first pinned layer. A magnetization direction of the first FM layer is parallel to the magnetization direction of the second FM layer. The first and second FM layers each individually comprises NiFe or NiFe and one or more of Co and CoFe, and wherein the AFM layer comprises IrMn. The second FM layer has a greater thickness than the first FM layer. The middle shield further comprises a dusting layer disposed between the first FM layer and the AFM layer, the dusting layer comprising Co or Ru. The first sensor and the second sensor each individually comprises one free layer. The first sensor and the second sensor each individually comprises two free layers. A magnetic recording head comprises the TDMR read head.

In another embodiment, a two dimensional magnetic recording (TDMR) read head comprises a first shield, a first sensor disposed over the first shield, a middle shield disposed over the first sensor, the middle shield comprising a first pinned layer, an antiferromagnetic coupling (AFC) layer disposed on the first pinned layer, and a second pinned layer disposed on the AFC layer, a second sensor disposed over the middle shield, and a second shield disposed over the second sensor, the second shield comprising a first ferromagnetic (FM) layer, an antiferromagnetic (AFM) layer disposed on the first FM layer, and a second FM layer disposed on the AFM layer.

The first sensor and the second sensor each individually comprises two free layers. The second sensor comprises first soft bias shields disposed adjacent to the middle shield and second soft bias shields disposed adjacent to the second shield, wherein a magnetization direction of the second pinned layer is parallel to a magnetization direction of the first soft bias shields, and wherein a magnetization direction of the first FM layer is parallel to a magnetization direction of the second soft bias shields. The second shield further comprises a dusting layer disposed between the first FM layer and the AFM layer. The first shield comprises a first FM layer, an AFM layer disposed on the first FM layer, and a second FM layer disposed on the AFM layer. The first sensor and the second sensor each individually comprises one free layer. A magnetic recording head comprises the TDMR read head.

In yet another embodiment, a two dimensional magnetic recording (TDMR) read head comprises a first shield, a first dual free layer (DFL) sensor disposed over the first shield, a middle shield disposed over the first sensor, the middle shield comprising a first ferromagnetic (FM) layer, an antiferromagnetic (AFM) layer disposed on the first FM layer, and a second FM layer disposed on the AFM layer, wherein a magnetization direction of the first FM layer is parallel to a magnetization direction of the second FM layer, a second DFL sensor disposed over the middle shield, and a second shield disposed over the second sensor, the second shield comprising a first pinned layer, an antiferromagnetic coupling (AFC) layer disposed on the first pinned layer, and a second pinned layer disposed on the AFC layer, wherein a magnetization direction of the first pinned layer is anti-parallel to the magnetization direction of the first FM layer.

The middle shield further comprises one or more dusting layers, each of the one or more dusting layers comprising CoFe, Co, or Ru. A first dusting layer of the one or more dusting layers is disposed between the first FM layer and the AFM layer. The first and second FM layers each individually comprises NiFe or NiFe and one or more of Co and CoFe, and wherein the AFM layer comprises IrMn. The second sensor comprises first soft bias shields disposed adjacent to the middle shield and second soft bias shields disposed adjacent to the second shield, wherein the magnetization direction of the second FM layer is parallel to a magnetization direction of the first soft bias shields, and wherein the magnetization direction of the first pinned layer is parallel to a magnetization direction of the second soft bias shields. A magnetic recording head comprises the TDMR read head.

While the foregoing is directed to embodiments of the present disclosure, other and further embodiments of the disclosure may be devised without departing from the basic scope thereof, and the scope thereof is determined by the claims that follow.

What is claimed is:

1. A two dimensional magnetic recording (TDMR) read head, comprising:

a first shield;

a first sensor disposed over the first shield, the first sensor comprising a first cap layer;

a middle shield disposed over the first sensor, the middle shield comprising a first ferromagnetic (FM) layer disposed in contact with the first cap layer, a dusting layer disposed in contact with the first FM layer, an antiferromagnetic (AFM) layer disposed in contact with the dusting layer, a second FM layer disposed on the AFM layer, and a second cap layer disposed in contact with the second FM layer;

a second sensor disposed over the middle shield, the second sensor comprising a seed layer, wherein the second cap layer is disposed in contact with the seed layer; and a second shield disposed over the second sensor, the second shield comprising a first pinned layer, an antiferromagnetic coupling (AFC) layer disposed on the first pinned layer, and a second pinned layer disposed on the AFC layer.

2. The TDMR read head of claim 1, wherein a magnetization direction of the second FM layer is anti-parallel to a magnetization direction of the first pinned layer.

3. The TDMR read head of claim 1, wherein a magnetization direction of the first FM layer is parallel to a magnetization direction of the second FM layer.

4. The TDMR read head of claim 1, wherein the first and second FM layers each individually comprises NiFe or NiFe and one or more of Ni, Fe, Co, and CoFe, and wherein the AFM layer comprises IrMn.

5. The TDMR read head of claim 1, wherein the second FM layer has a greater thickness than the first FM layer.

6. The TDMR read head of claim 1, wherein the dusting layer comprises Co or Ru.

7. The TDMR read head of claim 1, wherein the first sensor and the second sensor each individually comprises one free layer.

8. The TDMR read head of claim 1, wherein the first sensor and the second sensor each individually comprises two free layers.

9. A magnetic recording head comprising the TDMR read head of claim 1.

10. A two dimensional magnetic recording (TDMR) read head, comprising:

a first shield;

a first dual free layer (DFL) sensor disposed over the first shield, the first DFL sensor comprising a first cap layer;

a middle shield disposed over the first sensor, the middle shield comprising a first ferromagnetic (FM) layer disposed in contact with the first cap layer, a dusting layer disposed in contact with the first FM layer, an antiferromagnetic (AFM) layer disposed on the dusting layer, a second FM layer disposed in contact with the AFM layer, and a second cap layer disposed in contact with the second FM layer, wherein a magnetization direction of the first FM layer is parallel to a magnetization direction of the second FM layer;

a second DFL sensor disposed over the middle shield, the second DFL sensor comprising a seed layer, wherein the second cap layer is disposed in contact with the seed layer; and a second shield disposed over the second DFL sensor, the second shield comprising a first pinned layer, an antiferromagnetic coupling (AFC) layer disposed on the first pinned layer, and a second pinned layer disposed on the AFC layer, wherein a magnetization direction of the first pinned layer is anti-parallel to the magnetization direction of the first FM layer.

11. The TDMR read head of claim 10, wherein the dusting layer comprises one or more dusting layers, each of the one or more dusting layers comprising CoFe, Co, or Ru.

12. The TDMR read head of claim 10, wherein the first and second FM layers each individually comprises NiFe or NiFe and one or more of Co and CoFe, and wherein the AFM layer comprises IrMn.

13. The TDMR read head of claim 10, wherein the second DFL sensor comprises first soft bias shields disposed adjacent to the middle shield and second soft bias shields disposed adjacent to the second shield, wherein the magnetization direction of the second FM layer is parallel to a magnetization direction of the first soft bias shields, and wherein the magnetization direction of the first pinned layer is parallel to a magnetization direction of the second soft bias shields.

14. A magnetic recording head comprising the TDMR read head of claim 10.

15. A two dimensional magnetic recording (TDMR) read head, comprising:

a first shield;

a first dual free layer (DFL) sensor disposed over the first shield, the first DFL sensor comprising a cap layer;

a middle shield disposed over the first DFL sensor, the middle shield comprising:

a first ferromagnetic (FM) layer disposed in contact with the cap layer;

a first dusting layer disposed on the first FM layer;

an antiferromagnetic (AFM) layer disposed on the first dusting layer;

a second dusting layer disposed on the AFM layer;

a second FM layer disposed on the second dusting layer, wherein a magnetization direction of the first FM layer is parallel to a magnetization direction of the second FM layer;

a second DFL sensor disposed over the middle shield, the second DFL sensor comprising a seed layer, wherein the second FM layer is disposed in contact with the seed layer; and a second shield disposed over the second DFL sensor, the second shield comprising a first pinned layer, an antiferromagnetic coupling (AFC) layer disposed on the first pinned layer, and a second pinned layer disposed on the AFC layer, wherein a magnetization direction of the first pinned layer is anti-parallel to the magnetization direction of the first FM layer.

16. The TDMR read head of claim 15, wherein the first and second dusting layers each comprises CoFe, Co, or Ru.

17. The TDMR read head of claim 15, wherein the second DFL sensor comprises first soft bias shields disposed adjacent to the middle shield and second soft bias shields disposed adjacent to the second shield, wherein the magnetization direction of the second FM layer is parallel to a magnetization direction of the first soft bias shields, and wherein the magnetization direction of the first pinned layer is parallel to a magnetization direction of the second soft bias shields.

18. The TDMR read head of claim 15, wherein the first DFL sensor and the second DFL sensor each individually comprises two free layers.

19. The TDMR read head of claim 15, wherein the first and second FM layers each individually comprises NiFe or NiFe and one or more of Co and CoFe, and wherein the AFM layer comprises IrMn.

20. A magnetic recording head comprising the TDMR read head of claim 15.

* * * * *